(12) United States Patent
Chester (10) Patent No.: US 12,302,861 B2
(45) Date of Patent: May 20, 2025

(54) LIGHTWEIGHT AND FLEXIBLE CANINE FOOTWEAR

(71) Applicant: April Chester, Durham, NC (US)

(72) Inventor: April Chester, Durham, NC (US)

( * ) Notice: Subject to any disclaimer, the term of this patent is extended or adjusted under 35 U.S.C. 154(b) by 49 days.

(21) Appl. No.: 17/885,969

(22) Filed: Aug. 11, 2022

(65) Prior Publication Data

US 2023/0049781 A1 Feb. 16, 2023

Related U.S. Application Data (60) Provisional application No. 63/231,932, filed on Aug. 11, 2021.

(51) Int. Cl.
*A01K 13/00* (2006.01)
*A43B 23/02* (2006.01)

(52) U.S. Cl.
CPC ........ *A01K 13/007* (2013.01); *A43B 23/0245* (2013.01)

(58) Field of Classification Search
CPC .................................................. A01K 13/007
USPC ............................................ 119/850; 36/111
See application file for complete search history.

(56) References Cited

U.S. PATENT DOCUMENTS

| | | | | |
|---|---|---|---|---|
| 6,470,832 B1 * | 10/2002 | Peacock | ............... | A01K 13/007 54/82 |
| 6,694,713 B1 * | 2/2004 | MacDonald | ......... | A01K 13/007 54/82 |
| 10,342,226 B1 * | 7/2019 | Ford | .......................... | A01L 3/02 |
| 2007/0271681 A1 * | 11/2007 | Heisler | ................ | A01K 13/007 2/239 |
| 2014/0059892 A1 * | 3/2014 | Kosanke | .............. | A01K 13/007 36/111 |
| 2014/0150299 A1 * | 6/2014 | Entler | .................. | A01K 13/007 36/111 |
| 2014/0360053 A1 * | 12/2014 | Morris | ..................... | A43B 3/20 36/111 |
| 2015/0053148 A1 * | 2/2015 | Huang | ..................... | D03D 1/00 28/169 |
| 2018/0317453 A1 * | 11/2018 | Walker | ....................... | A01L 5/00 |
| 2019/0281793 A1 * | 9/2019 | Paxton | ................ | A01K 13/007 |
| 2020/0093095 A1 * | 3/2020 | Allami | ................ | A01K 13/007 |
| 2020/0196572 A1 * | 6/2020 | Oh | ........................ | A01K 13/007 |

(Continued)

FOREIGN PATENT DOCUMENTS

WO WO-2020054970 A1 * 3/2020 ........... A01K 13/007

*Primary Examiner* — Joshua J Michener
*Assistant Examiner* — Nicole Paige MacCrate
(74) *Attorney, Agent, or Firm* — Ashley D. Johnson; Dogwood Patent and Trademark Law (57) ABSTRACT

The invention is generally directed to an improved dog shoe that can be easily and comfortably worn by a dog and is retained on the paw until the user removes it. The shoe includes a bottom sole that provides a support surface between the bottom of the dog's paw and the ground. The shoe further includes a heel portion positioned along the back side of the dog's paw, and a cuff that secures the shoe around the ankle portion of the dog's paw. A tongue extends over the front portion of the dog's paw, through the toes of the dog, and is retained on the front face of the cuff using one or more retention straps. Advantageously, the shoe is securely retained on the dog's paw, allowing the dog the freedom to cover a wide variety of terrains and still protect their paws.

20 Claims, 11 Drawing Sheets

(56) References Cited

U.S. PATENT DOCUMENTS

2021/0153460 A1\* 5/2021 Vesztergom ......... A01K 13/007
2023/0020508 A1\* 1/2023 Mason ................. A01K 13/007

\* cited by examiner

LIGHTWEIGHT AND FLEXIBLE CANINE FOOTWEAR

CROSS-REFERENCE TO RELATED APPLICATIONS

This application claims priority to U.S. Provisional Patent Application No. 63/231,932 filed Aug. 11, 2021, the entire content of which is hereby incorporated by reference herein.

TECHNICAL FIELD

The presently disclosed subject matter is generally directed to lightweight and flexible footwear for canines and other animals.

BACKGROUND

Dogs serve very diverse functions, such as providing companionship and protection, assistance while hunting, help for the impaired (e.g., seeing eye-dogs, hearing-assist dogs), as well as providing police or military support. Due to the varied functions of dogs, they are active in many different environments. As such, protecting a dog's paws is an important consideration. The feet and paws of dogs are complex appendages that provide for mobility, shock absorption, traction, digging, and gripping of objects (e.g., sticks and toys). Common problems associated with the paws include cuts, abrasions, tears, burns, and/or blisters caused by contact with hot surfaces, infection due to environmental exposure to cuts, frostbite from cold weather, chemical burns from de-icing salt, as well as ticks or mites. Therefore, there is a need for some dog owners to equip their dogs with footwear to prevent injury, provide traction, and/or for protection during recovery and healing. Prior art attempts to provide shoes for dogs have found little practical utility. Specifically, prior art shoes are difficult to put on the dog's paws, do not include support between the toes, and do not remain on the paw. Other prior art versions are uncomfortable such that the dog is distracted and motions to remove the shoe. It would therefore be beneficial to provide a dog shoe that overcomes the shortcomings of the prior art.

SUMMARY

In some embodiments, the presently disclosed subject matter is directed to a dog shoe. The shoe comprises a sole comprising a top face and an opposed bottom face, a toe end and an opposed heel end. The shoe also includes a rear flap with a first end and a second end, the first end attached to the heel end of the sole and extending in an upward direction. The shoe includes a recloseable cuff positioned at the second end of the rear flap, the cuff comprising first and second ends, wherein the cuff comprises an open position with the first and second cuff ends opposed from each other and a closed position where the first and second cuff ends of the cuff are attached to form a loop. The shoe includes a tongue attached to the toe end of the sole, comprising at least one opening and a length defined by an attachment that releasably attaches to a retention element positioned on a front face of the cuff when the cuff is in the closed position. The shoe includes a recloseable strap positioned at the second end of the rear flap external to the recloseable cuff, the strap comprising first and second ends, wherein the strap comprises an open position with the first and second strap ends opposed from each other and a closed position where the first end second strap ends are attached to form a loop to close around an exterior surface of the cuff when the cuff is in the closed position and when the tongue attachment is positioned on the front face of the cuff.

In some embodiments, the sole is releasably attached to the tongue and rear flap.

In some embodiments, the rear flap is curved.

In some embodiments, the shoe is coated with a durable water repellent material.

In some embodiments, the sole comprises an interior defined by one or more padded materials.

In some embodiments, the cuff ends, strap ends, or both are secured around the dog's ankle region using hook and loop closure, snaps, clips, buttons, ties, fasteners, or combinations thereof.

In some embodiments, the sole comprises a squared heel end, a rounded toe portion, and a widened body portion.

In some embodiments, the presently disclosed subject matter is directed to a kit. Specifically, the kit comprises a plurality of soles, each comprising a top face and an opposed bottom face, a toe end, and an opposed heel end. The kit includes one or more rear flaps, each with a first end and a second end, the first end attached to the heel end of the sole and extending in an upward direction. The kit includes one or more recloseable cuffs positionable at the second end of the rear flap, each cuff comprising first and second ends, wherein each cuff comprises an open position with the first and second cuff ends opposed from each other and a closed position where the first and second cuff ends of the cuff are attached to form a loop. The kit includes one or more tongues configured to be attached to the toe end of a sole, each comprising at least one opening and a length defined by an attachment that releasably attaches to a retention element positioned on a front face of the cuff when the cuff is in the closed position. The kit includes one or more recloseable straps positionable at the second end of the rear flap external to the recloseable cuff, the strap comprising first and second ends, wherein the strap comprises an open position with the first and second strap ends opposed from each other and a closed position where the first end second strap ends are attached to form a loop to close around an exterior surface of the cuff when the cuff is in the closed position and when the tongue attachment is positioned on the front face of the cuff.

In some embodiments, each sole releasably attaches to a rear flap and tongue.

In some embodiments, the sole is releasably attached to the rear flap and tongue using one or more of hook and loop closure, snaps, buttons, magnets, zippers, ties, fasteners, or clips.

In some embodiments, the sole is customized for a dog based on shoe size, ankle size, tread, shoe material, level of padding, or combinations thereof.

In some embodiments, the presently disclosed subject matter is directed to a method of protecting a dog's paws from a support surface. Specifically, the method comprises positioning the dog shoe of claim 1 on a first dog paw such that a top surface of the sole contacts a bottom surface of the dog's paw. The method includes applying the cuff to the closed position around an exterior surface of the paw. The method includes positioning one or more dog toes through each tongue opening. The method includes securing the tongue adjacent to the front face of the cuff. The method includes positioning the first and second ends of the strap to the closed position around the exterior of the cuff, whereby the dog's paw is protected from the external environment.

In some embodiments, the method includes comprising repeating the steps for the remaining dog paws.

In some embodiments, the sole is selected based on predetermined use parameters.

In some embodiments, the predetermined use parameters are selected from terrain, temperature, presence of ice or snow, presence of rain, or combinations thereof.

In some embodiments, the sole is releasably attached to the tongue and rear flap.

In some embodiments, the bottom face of the sole comprises treads.

In some embodiments,

DETAILED DESCRIPTION

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1A:
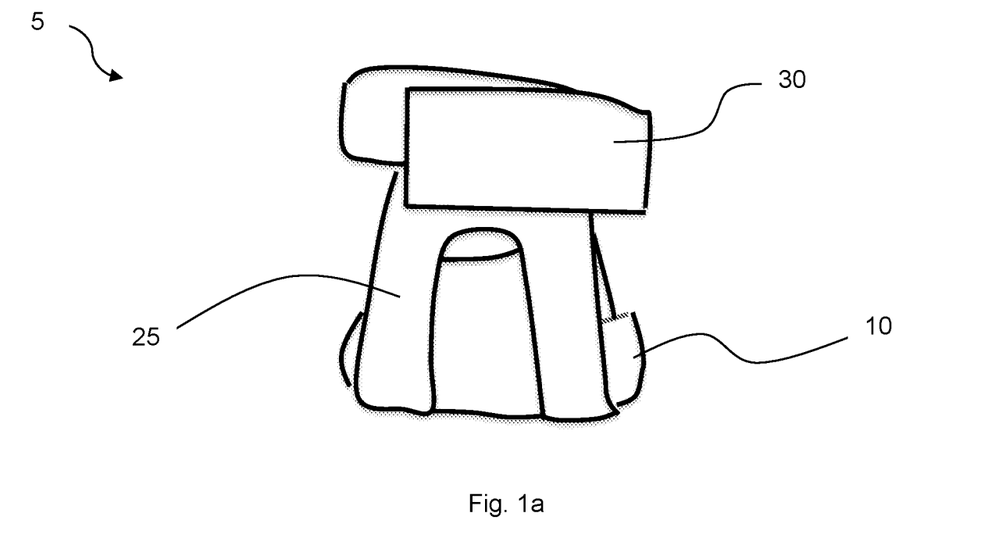
FIG. 1a is a front perspective view of a dog shoe in a use position in accordance with some embodiments of the presently disclosed subject matter.
Figure 1B:
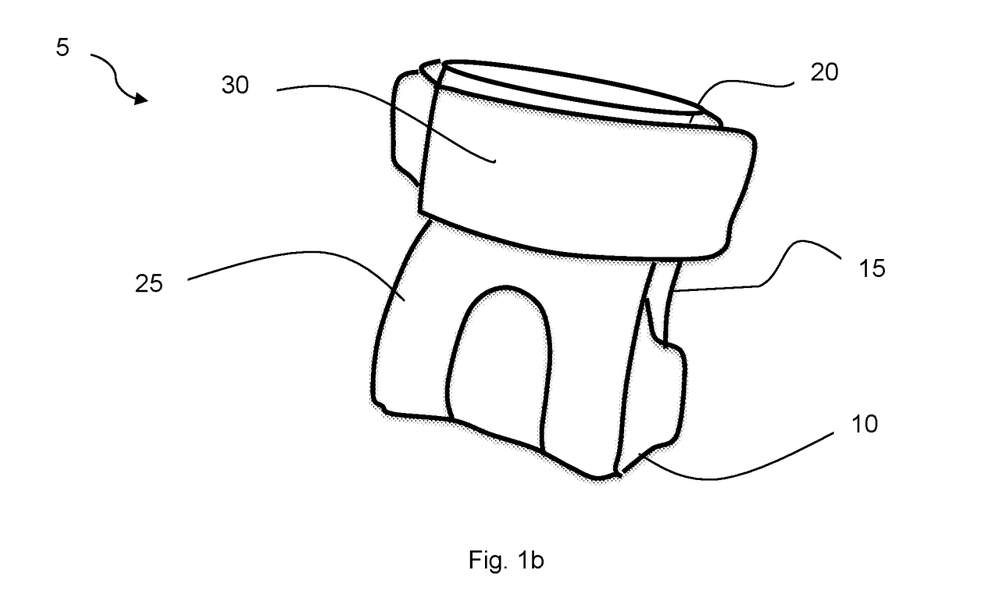
FIG. 1b is a side perspective view of a dog shoe in a use position in accordance with some embodiments of the presently disclosed subject matter.

The presently disclosed subject matter is generally directed to an improved dog shoe that can be easily and comfortably worn by a dog and is retained on the paw until the user removes it. FIGS. 1a and 1b illustrate one embodiment of dog shoe 5 comprising sole 10 that provides a support surface between the bottom of the dog's paw and the ground. The shoe further includes rear flap 15 positioned along the back side of the dog's paw, and cuff 20 that is wrapped around the ankle portion of the dog's paw. Tongue 25 extends over the front portion of the dog's paw, through the toes of the dog, and is retained on the front face of cuff 20 using a retention material (such as hook and loop or snaps) between the tongue and cuff and/or retention straps 30. Advantageously, the shoe is securely retained on the dog's paw, allowing the dog the freedom to cover a wide variety of terrains and still protect their paws. Further, the shoe protects the dog's paws from temperature extremes, cold weather, chemical burns, dirty street conditions, sharp objects, and the like while also providing traction in slippery or uneven surfaces. The shoe also allows the dog to feel the ground surface with the toes/claws, such that the dog is able to use the claws naturally for traction and movement.

Figure 2A:
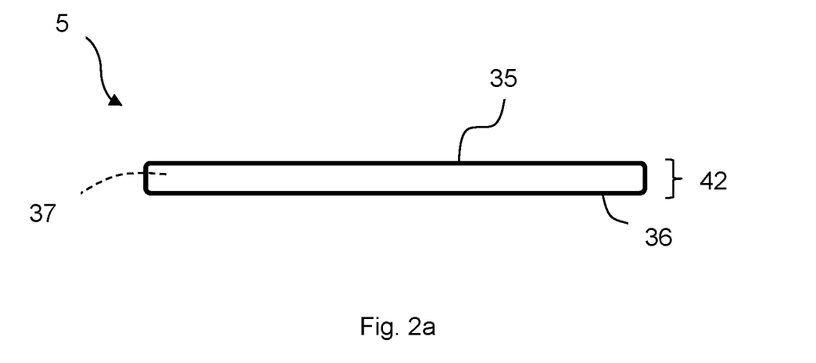
FIG. 2a is a side plan view of a sole in accordance with some embodiments of the presently disclosed subject matter.
Figure 2B:
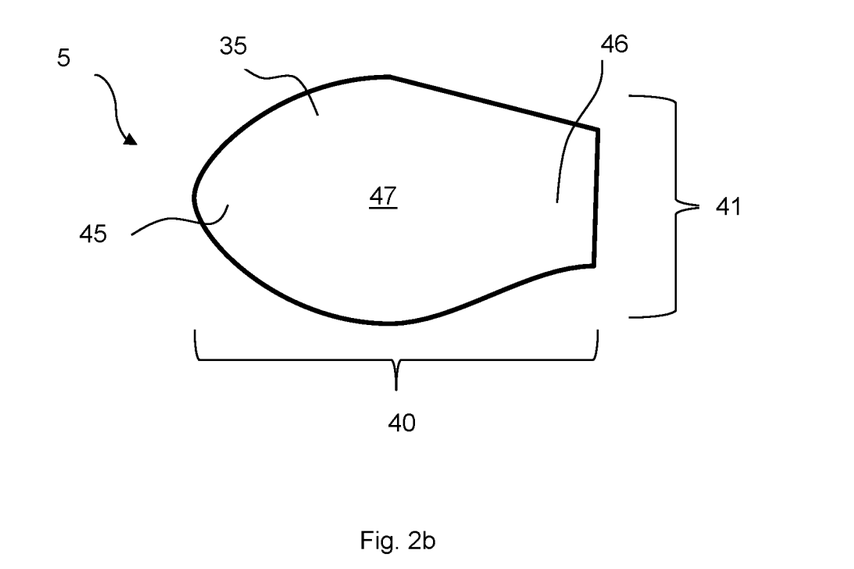
FIG. 2b is a top plan view of a sole in accordance with some embodiments of the presently disclosed subject matter.

As set forth above, dog shoe 5 includes sole 10 that contacts the bottom of the dog's paw and provides support. The term "sole" as used herein refers to the bottom layer of the shoe that contacts the ground in use. Stated another way, the sole is positioned between the dog's foot and the ground. The sole acts as a barrier, protecting the dog's paw from snow, ice, rocky surfaces, etc. FIGS. 2a and 2b illustrate one embodiment of sole 10 comprising top surface 35 that directly contacts the bottom of a dog's paw and opposed bottom surface 36 that contacts the ground or other surface. In some embodiments, the sole can be configured in rounded shape as shown in FIG. 2b. However, the sole can be configured in any desired shape to accommodate the dog's paw pads and other anatomical elements (e.g., square, rectangular, round, oval). For example, the sole can have a squared off rear end 46, a rounded toe end 45, and a wide body portion 47, as shown in FIG. 2b.

The sole can have any desired length 40 and/or width 41 to accommodate a wide variety of dog breeds and sizes. The term "length" refers to the longest horizontal distance of the sole. The term "width" refers to the longest distance perpendicular to the length. In some embodiments, the sole length and/or width can be about 1-5 inches (e.g., at least/no more than about 1, 2, 3, 4, or 5 inches). Sole 10 further includes thickness 42 of about 0.1-1 inches (e.g., at least/no more than about 0.1, 0.2, 0.3, 0.4, 0.5, 0.6, 0.7, 0.8, 0.9, or 1 inch). The term "thickness" refers to the longest vertical distance between the top and bottom surfaces of the sole. It should be appreciated that the length, width, and thickness of the sole can be configured with any desired dimensions and are not limited to the ranges given herein.

Sole 10 also includes interior 37 comprising any of a wide variety of materials. For example, the sole interior can include padding to provide a level of comfort to the paw while walking over rocky or uneven surfaces. In some embodiments, the interior of the sole can include insulating materials to protect the dog's paw from snowy or heated conditions. The interior of the sole can also provide a shock absorbing function during running or jumping. Interior 37 can therefore include one or more suitable materials, such as (but not limited to) foam, cotton, wool, animal fiber, polyester, rayon, yarn, fiber trace, acetate, latex, linen, neoprene, nylon, polyester, spandex, fabric, rubber, PVC, or combinations thereof. In some embodiments, sole 10 can include one or more thermally insulating materials. The term "thermally insulating" refers to the property of being resistant to the transfer or heat or cold across a material (e.g., a thermal conductivity of less than about 100 W/m-K). Thus, a thermally insulating material does not readily transfer thermal energy to another material or through itself. Suitable thermally insulating materials can include (but are not limited to) rubber, neoprene, aerogel, polystyrene, mineral wool, polyethylene foam, basalt wool, mineral wool, polyurethane foam, or combinations thereof.

Figure 2C:
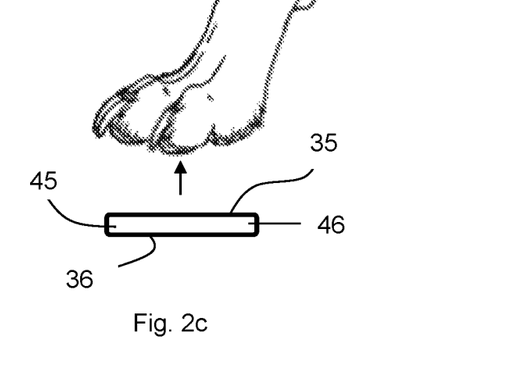
FIGS. 2c and 2d are side plan views of soles positioned on a dog's foot in accordance with some embodiments of the presently disclosed subject matter.
Figure 2D:
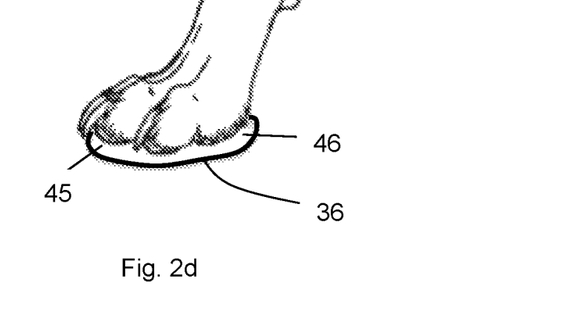

As noted above, the sole comprises toe end 45 positioned adjacent to the front of the dog's paw (e.g., adjacent to the toes) and opposed heel end 46 positioned adjacent to the back end of the dog's paw, as shown in FIGS. 2c and 2d.

Figure 2E:
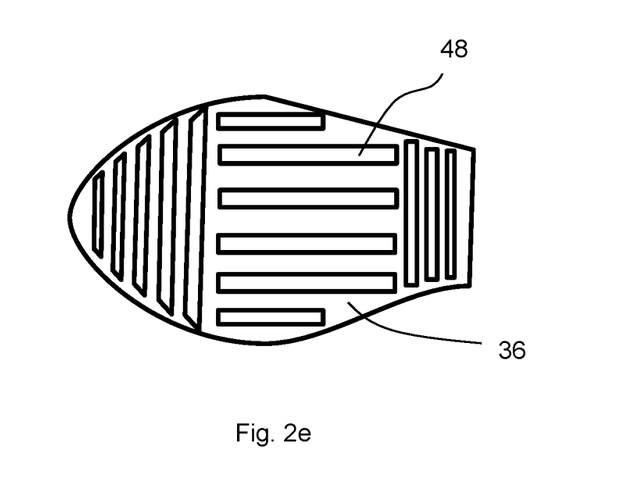
FIG. 2e is a bottom plan view of a sole in accordance with some embodiments of the presently disclosed subject matter.

The bottom surface of sole 10 can optionally include any of a wide variety of treads 48 to enhance traction, as illustrated in FIG. 2e. The term "treads" refers broadly to any element or combination of elements that provide a gripping function to the bottom of shoe 5. For example, treads 45 can include raised elements, recessed elements, textured elements, or combinations thereof. The treads can be uniform in size and/or shape, or can be varied in type, size, shape, and/or or orientation. The treads provide bottom surface 36 of the sole with increased durability and wear resistance, as well as improved traction on various types of terrain. For example, treads 48 can provide shoe 5 with enhanced traction on a polished wood floor, thereby facilitating movement and decreasing the risk of injury due to a fall. Furthermore, dogs suffering from conditions such as arthritis are more easily able to rise from a sitting or lying position with the help of treads 48.

In some embodiments, the sole is removeable from shoe 5 to allow the sole to be mixed and matched as desired by the owner. For example, if icy conditions are present, a sole with a first set of treads can be used. However, if the dog will be walking on hot pavement in the summertime, a different sole can be used, with temperature insulating characteristics. Further, if the dog will be moving on rocky terrain, a sole with increased padding can be selected. The sole can be releasably attached to heel 15 and/or tongue 25 using any desired method, such as (but not limited to) the use of VELCRO®, ties, clips, magnets, fasteners, mechanical elements (bolts, screws, etc.), and the like.

Figure 3A:
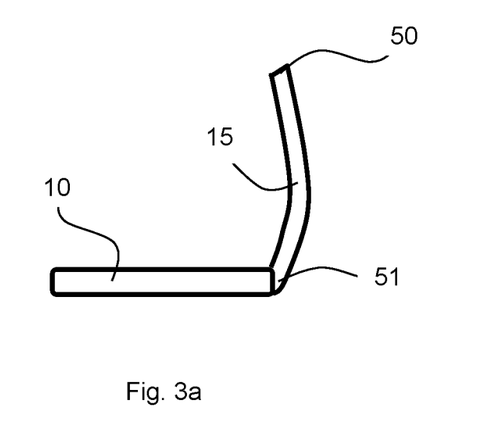
FIG. 3a is a side plan view of a shoe sole and rear flap in accordance with some embodiments of the presently disclosed subject matter.
Figure 3B:
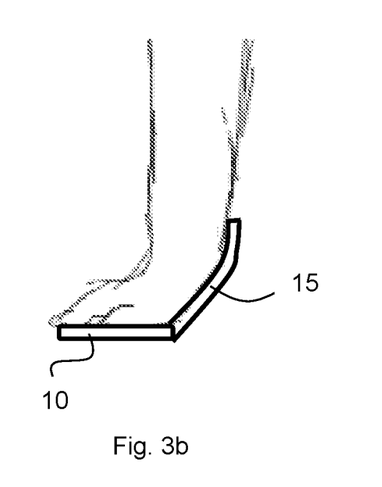
FIG. 3b is a side plan view of a shoe sole and rear flap in accordance with some embodiments of the presently disclosed subject matter.

Shoe 5 includes rear flap 15 that is releasably or permanently attached to heel end 46 of the sole to support the back of the dog's paw and leg, as shown in FIGS. 3a and 3b. Rear flap 15 includes top edge 50 and opposed bottom edge 51 that is positioned adjacent to sole 10. Thus, the rear flap can be permanently or releasably attached to the sole using any method, such as the use of sewing, epoxy, clips, magnets, buttons, snaps, fasteners, and the like.

In some embodiments, flap 15 can be configured with a rounded shape to accommodate the structure of the rear of the dog's paw, although any shape can be used. The cuff can extend up from the dog's paw to provide support for the shoe and to allow for attachment to the dog's leg (e.g., the ankle region above the paw).

Cuff 20 is positioned at top edge 50 of the rear flap, and functions to retain the shoe on the dog's paw. The term "cuff" refers to any of a wide variety of releasable bands. In some embodiments, the cuff includes one or more arms 55 that releasably cooperate to close around the dog's ankle forming a closed loop, as shown in FIGS. 4*a*-4*d*. The cuff can be secured closed using any conventional mechanism, such as (but not limited to) the use of VELCRO®, magnets, ties, clips, fasteners, elastic, cords, snaps, zippers, buttons, and the like that can be positioned on at least one surface of the cuff. Advantageously, the cuff helps to keep shoe 5 secured to the dog's paw and helps reduce the tendency of the shoe to slip, twist, or otherwise fall off the dog's paw during use. The cuff also allows substantially unhindered movement of the dog's leg and paw tendons.

Figure 4A:
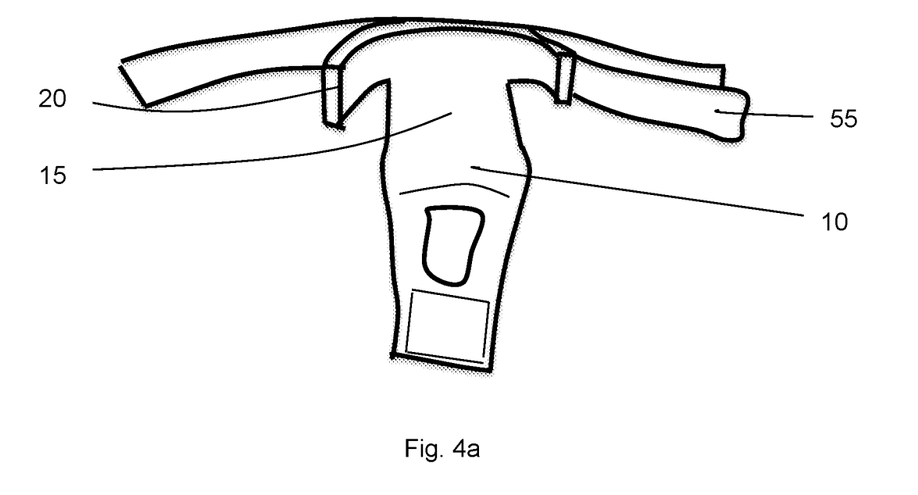
FIG. 4a is a front plan view of a shoe in an open configuration in accordance with some embodiments of the presently disclosed subject matter.
Figure 4B:
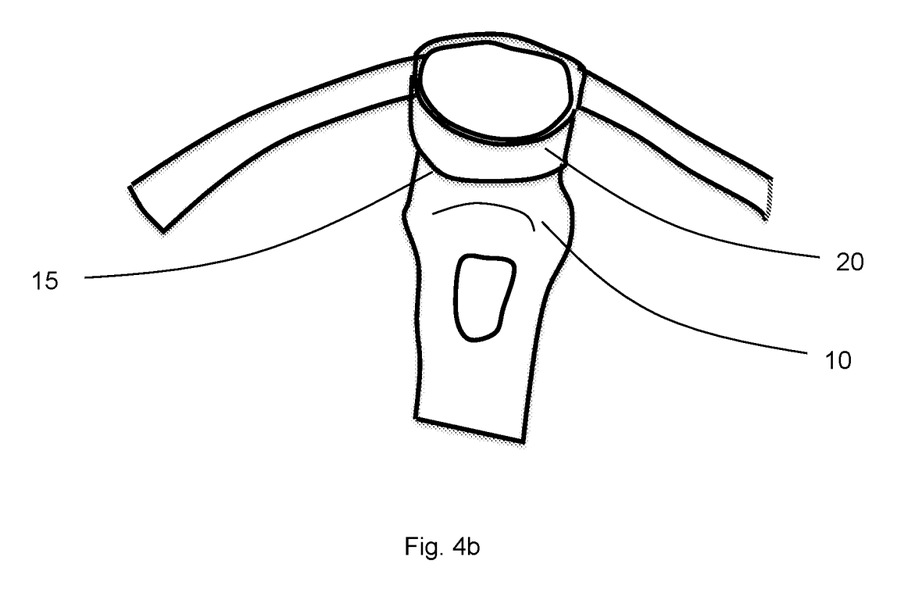
FIG. 4b is a front plan view of a shoe with the cuff secured in accordance with some embodiments of the presently disclosed subject matter.
Figure 4C:
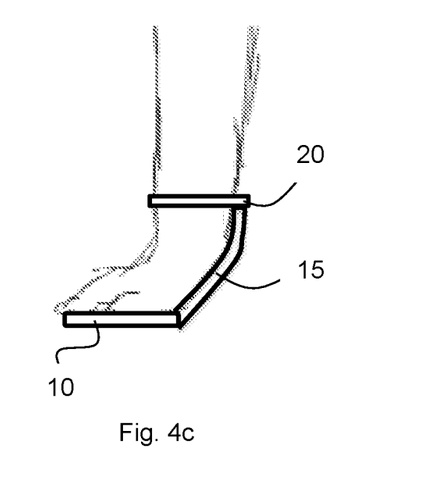
FIG. 4c is side plan view of a dog paw with a shoe sole, rear flap, and cuff in accordance with some embodiments of the presently disclosed subject matter.
Figure 4D:
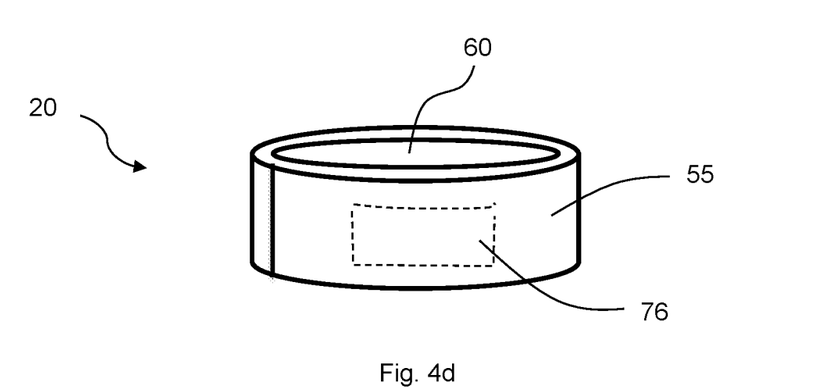
FIG. 4d is a perspective view of a cuff in a secured orientation in accordance with some embodiments of the presently disclosed subject matter.
Figure 4E:
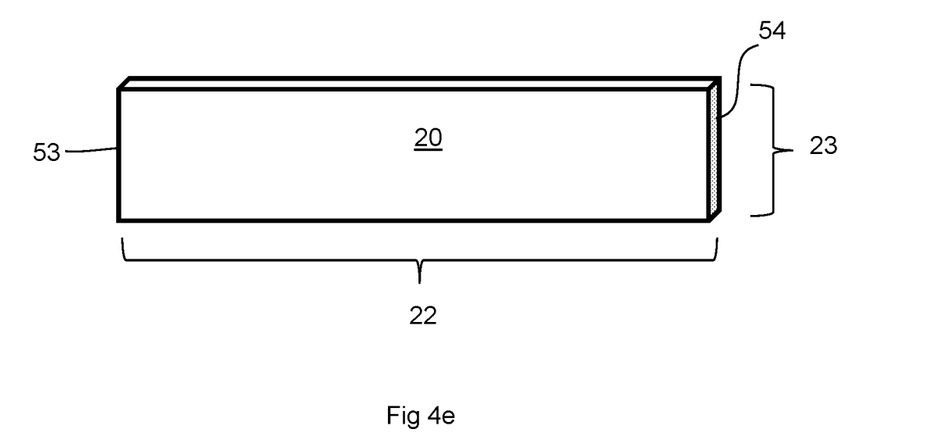
FIG. 4e is a perspective view of a shoe cuff in an extended orientation in accordance with some embodiments of the presently disclosed subject matter.

Cuff 20 can have any desired length and/or width to accommodate a wide variety of dogs. For example, the cuff length 22 can be about 3-10 inches (e.g., at least/no more than about 3, 4, 5, 6, 7, 8, 9, or 10 inches). The cuff length can span the distance between first end 53 and second end 54 of the cuff. Similarly, the cuff width 23 can about 0.5-1 inches, as illustrated in FIG. 4*e*. However, the cuff dimensions are not limited and can be scaled up or down to be customized for a particular dog or dog breed.

Interior surface of cuff 20 (e.g., the surface in direct contact with the dog's leg in use) can include one or more padded materials 60 to provide an added level of comfort for the dog. In this way, the cuff does not chafe or irritate the dog's leg. Any padded material can be used, such as foam, fabric, air cellular material, and the like.

Figure 5A:
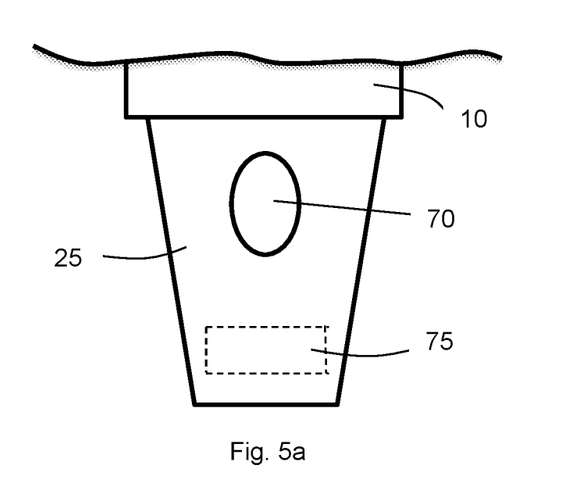
FIG. 5a is a top plan view of a shoe tongue in accordance with some embodiments of the presently disclosed subject matter.
Figure 5B:
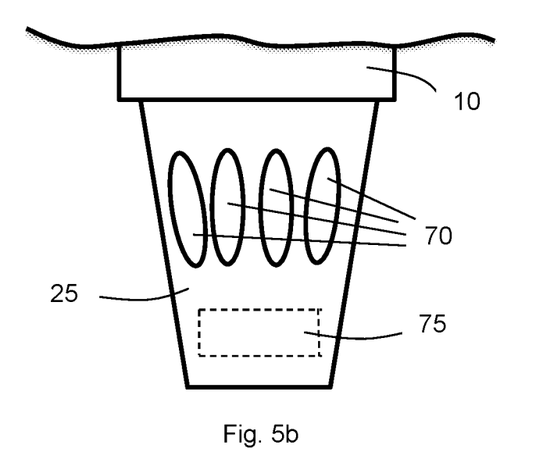
FIG. 5b is a top plan view of a shoe tongue in accordance with some embodiments of the presently disclosed subject matter.

Front end 45 of the sole is permanently or releasably attached to tongue 25 that fits between the two or more of the dog's individual toes, as shown in FIG. 5*a*. Thus, tongue 25 includes one or more openings 70 sized and shaped to facilitate placement of one or more toes of the dog within the tongue (e.g., one, two, three, or four toes) as shown in FIG. 5*b*. Opening 70 can have any desired shape, such as circular, oval, square, rectangular, triangular, abstract, and the like.

In some embodiments, the tongue can include a single opening 70, as shown in FIG. 5*a*. However, the presently disclosed subject matter is not limited and can include any number of openings to fit any number of the dog's toes (e.g., 1-4 openings) as shown in FIG. 5*b*. In other embodiments, the openings are sized to accommodate more than one toe. Thus, two of the dog's toes can fit into an opening.

Figure 5C:
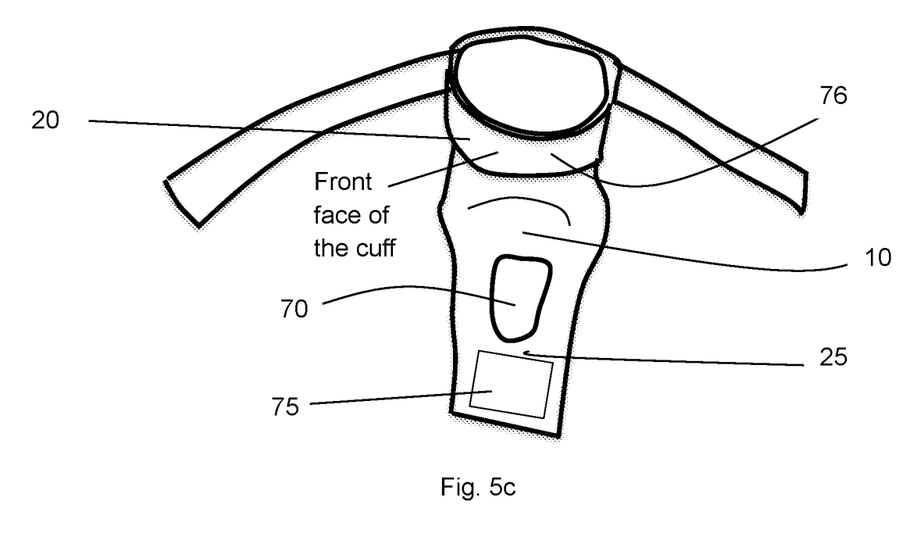
FIGS. 5c and 5d are front plan views illustrating the tongue in a use position in accordance with some embodiments of the presently disclosed subject matter.
Figure 5D:
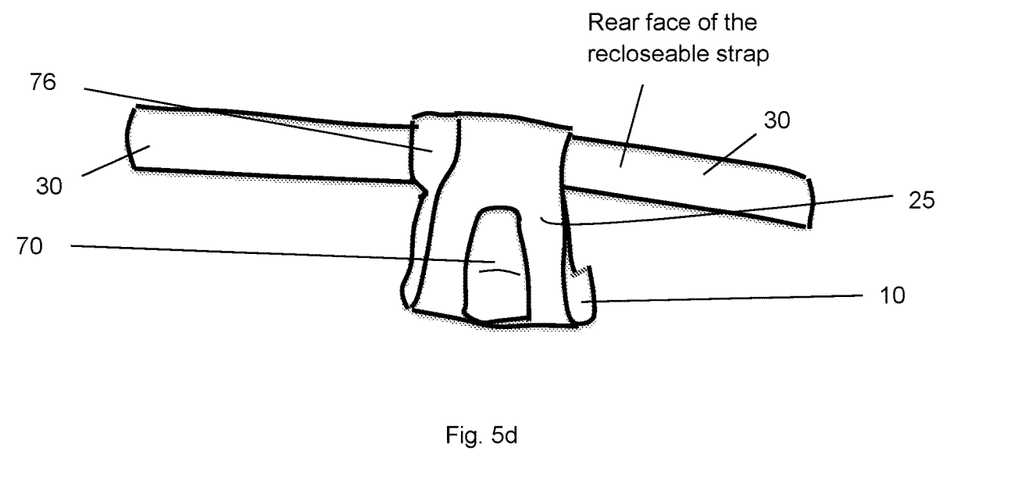
Figure 5E:
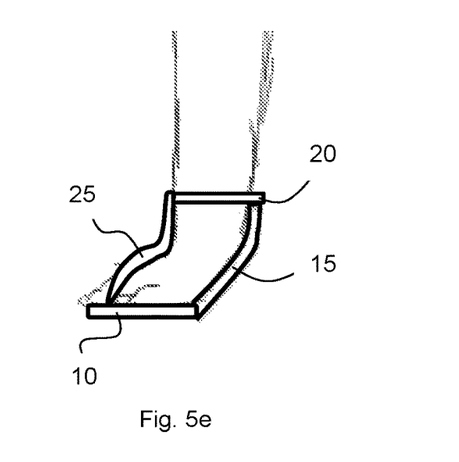
FIG. 5e is a side view of a dog shoe comprising a sole, rear flap, cuff, and tongue assembled in accordance with some embodiments of the presently disclosed subject matter.

The top surface of tongue 25 also includes attachment 75 that cooperates with retention element 76 positioned on the front face of the cuff. The retention element functions to retain the tongue in an adjacent position by releasably joining with the attachment, as illustrated in FIGS. 5*c*-5*e*. Therefore, one or more dog toes are positioned to extend through the tongue opening, while the attachment is positioned in an upward direction to affix onto the cuff retention element. The cuff retention element and tongue attachment can cooperate using any conventional method, such as (but not limited to) VELCRO®, clips, snaps, buttons, ties, and the like. In some embodiments, the tongue attachment can be permanently connected to the front face of the cuff, such as by sewing or other known mechanisms.

Figure 6A:
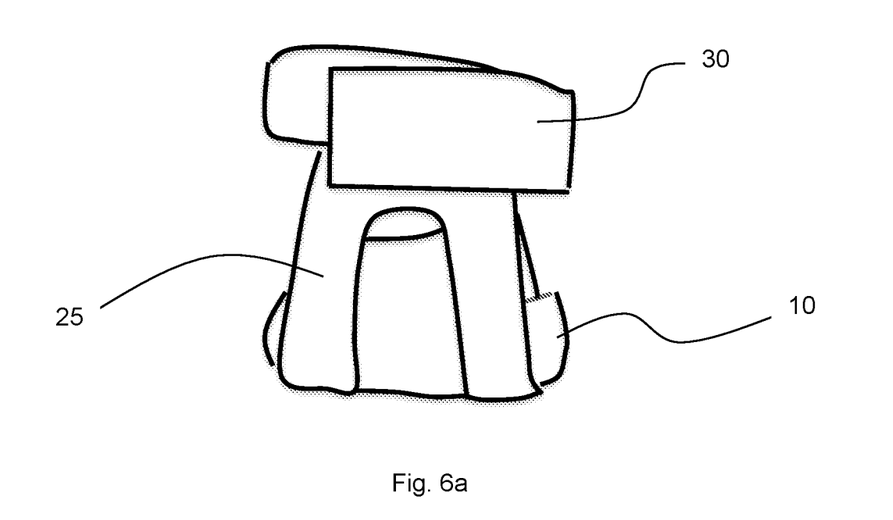
FIG. 6a is a front plan view of a shoe with external straps secured in the use position in accordance with some embodiments of the presently disclosed subject matter.
Figure 6B:
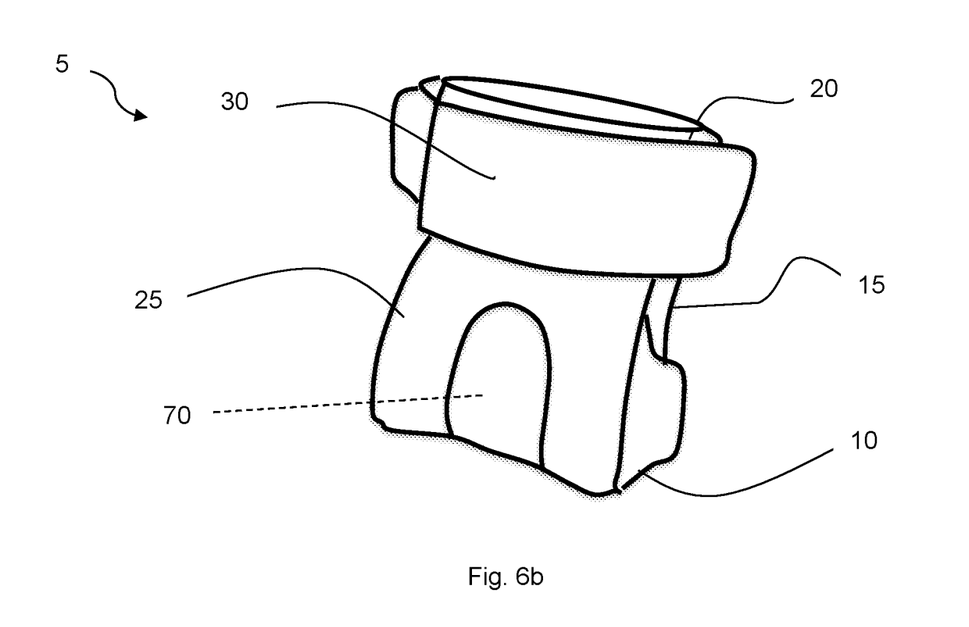
FIG. 6b is a perspective view of a shoe with external straps secured in the use position in accordance with some embodiments of the presently disclosed subject matter.
Figure 6C:
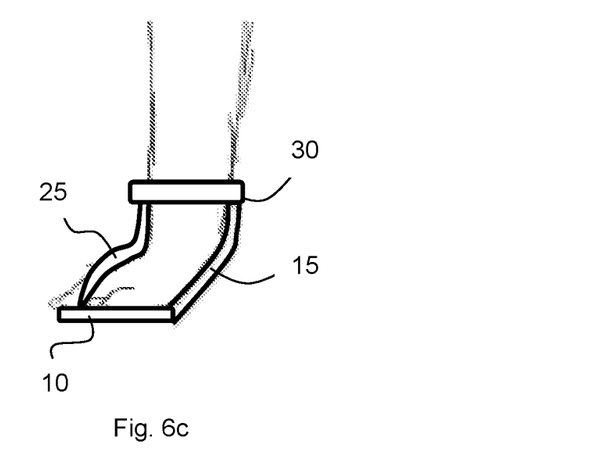
FIG. 6c is a side view of a dog shoe configured on a paw in accordance with some embodiments of the presently disclosed subject matter.

A pair of straps 30 are configured at the top edge of the heel, exterior to cuff 20. The straps are wrapped around the exterior of the cuff to retain the tongue in proper position on the cuff, as shown in FIGS. 6*a*-6*c*. Straps 30 can be attached together using any suitable mechanism, such as (but not limited to) VELCRO®, ties, clips, magnets, snaps, buttons, zippers, and the like. In some embodiment, the straps can include buckles or other adjustable elements to more comfortably and/or securely affix the straps around the dog's ankle.

Figure 6D:
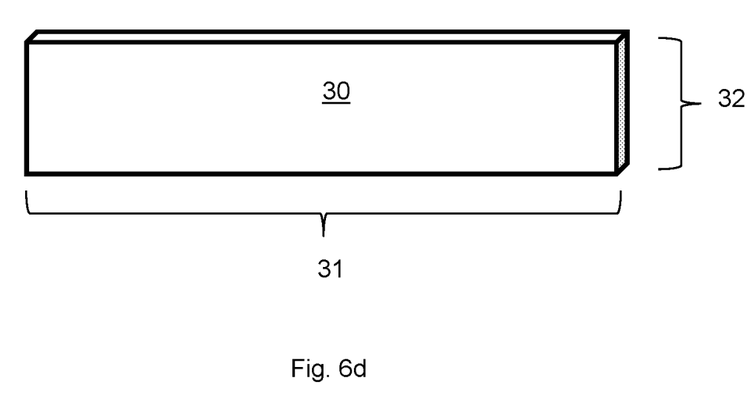
FIG. 6d is a perspective view of shoe straps in an extended orientation in accordance with some embodiments of the presently disclosed subject matter.

The straps include a first end and a second end, with a length therebetween. The straps can have any desired length 31, such as (but not limited to) about 3-12 inches (e.g., at least/no more than about 3, 4, 5, 6, 7, 8, 9, 10, 11, or 12 inches). The straps can further include width 32 of about 1 inch, as shown in FIG. 6*d*. However, the dimensions of the strap can be varied to accommodate any of a wide variety of dog paw shapes and sizes.

Shoe 5 can be constructed from any of a wide variety of materials. For example, suitable materials can include (but are not limited to) leather, canvas, fabric, microfiber, plastic, neoprene, and the like. In some embodiments, one or more mesh materials can be used for to give the shoe an air permeable and lightweight quality. The materials used for construction of shoe 5 can provide for a flexible fit that conforms to the shape of the dog's paw and allow tactile feeling in the paws. Thus, the dog may be able to feel the ground through the shoes.

Shoes 5 can be produced in a variety of sizes to fit the feet of dogs of various breeds and may be formed of materials of different colors and textures.

In some embodiments, shoes 5 can be provided as part of a kit. Specifically, the kit can include one or more shoe tongues, flaps, cuffs, and straps. In addition, the kit can include a variety of soles to allow the shoes to be optimally used in a variety of environments. For example, a sole with thick treads on bottom surface 36 can be used in icy or snowy conditions. Soles with a thick interior can be used in rocky terrain to provide an added measure of comfort to the dog's paws. The soles can be attached and detached using any conventional mechanism, such as snaps, clips, buttons, magnets, zippers, VELCRO®, and the like.

Generally, a dog's front paws are slightly larger than a dog's rear paws. Therefore, in certain embodiments where four dog boots are provided in a kit, the kit comprises two smaller dog boots intended for the dog's rear paws, and two slightly larger dog boots intended for the dog's front paws.

In use, the dog owner fits the shoes to the dog by first placing a paw bottom surface adjacent to and contacting the top surface of sole 10 with rear flap 15 positioned at the rear of the dog's paw extending in an upward direction up the dog's leg. Cuff 20 is then configured around the dog's ankle region, securing the shoe to the dog's leg. Tongue 25 can be maneuvered such that one or more toes of the dog extend through opening 70. The tongue is then retained against the front face of the cuff, and straps 30 are positioned around the exterior of the cuff. The action is repeated for each paw. After use, the shoe can be removed by releasing straps 30, freeing the tongue from cuff 20, and removing the toes from tongue opening 70. The cuff can then be released, allowing the rear flap and sole to be removed from the dog's paw.

It should be appreciated that while the instant disclosure has been described as being applicable to dogs, it can equally be used with a wide variety of animals, such as (but not limited to) cats, rabbits, monkeys, and the like.

Shoe 5 offers many advantages over current dog shoes. For example, shoe 5 allows the dog's paw to be thoroughly enveloped. When cuff 20 and straps 30 are fastened, the shoe can easily hold and retain the dog's instep, sole pads, and heel area.

When the dog runs or makes sudden movements, shoe 5 remains securely fastened around the dog's paw and is not twisted or deformed due to the presence of both cuff 20, the retention of the tongue on the cuff, and straps 30.

Shoe 5 provides added comfort to the dog's paw. Specifically, the interior of cuff 20 and/or sole 10 can include padded materials to provide an extra layer of protection. Further, the cuff can be located either above or below the dog's dewclaw, avoiding irritation and discomfort. In addition, the dog's instep, sole pads, and heel area are all enveloped by the shoe, increasing comfort.

Cuff 20 and straps 30 are highly adaptable with a wide range of adjustability to adapt for different sizes of dog feet. Specifically, the cuff and straps can be tightened or loosened as needed to adapt to a dog's paw.

By providing a barrier between a dog's paws and the external environment, the shoes protect a dog's feet and paws from cold weather conditions and from frostbite, and also protect the dog from hot weather conditions and hot surface temperatures, which can cause blisters or burns on the paws. Additionally, the shoes protect against chemicals such as de-icing salt commonly found on sidewalks and driveways in the wintertime.

When the cuff and straps are activated, rear flap 15 and tongue 25 lock the dog's heel and toes into position, making the shoe comfortable on the dog's paw. The dog's paw is also prevented from coming out of the shoe.

Shoes 5 can be used to protect the dog's paw after injury or surgery. For example, the dog may be unable to lick or access a wound or dressing on the paw, offering a protective function.

The disclosed shoes can also keep a dog's paws clean when outside, thereby saving the hassle and time associated with washing a dog's feet when dirty.

Further, shoes 5 can be worn indoors to prevent scratches on flooring (e.g., wood floors) or furniture.

The foregoing descriptions have been presented for purposes of illustration and description and are not intended to be exhaustive or to limit the presently disclosed subject matter. Many modifications and variations are possible in light of the present disclosure.

What is claimed is:

1. A dog shoe comprising:
a sole comprising a top face and an opposed bottom face, a toe end, and an opposed heel end;
a rear flap with a first end and a second end, the first end attached to the heel end of the sole and extending in an upward direction;
a recloseable cuff positioned at the second end of the rear flap, the cuff comprising first and second ends, wherein the cuff comprises an open position with the first and second cuff ends opposed from each other and a closed position where the first and second cuff ends of the cuff are attached to form a loop;
a tongue attached to the toe end of the sole and extending in a forward direction in front of the sole in a first position and extending upward to contact the cuff in a second position, the tongue comprising a top surface and an opposed bottom surface, the tongue comprising at least one opening that extends through the top and bottom surfaces of the tongue wherein the at least one opening is positioned adjacent to the toe end of the sole in the second position and configured to allow one or more toes of an animal to extend therethrough, wherein the tongue includes an attachment positioned on the top surface of the tongue that releasably attaches to a retention element positioned on a front face of the cuff when the cuff is in the closed position; and
a recloseable strap positioned at the second end of the rear flap external to the recloseable cuff, the strap comprising first and second ends, wherein the strap comprises an open position with the first and second strap ends opposed from each other and a closed position where the first end second strap ends are attached to form a loop to close around an exterior surface of the cuff when the cuff is in the closed position and when the tongue attachment is positioned on the front face of the cuff, such that the tongue is sandwiched between the front face of the cuff and a rear face of the recloseable strap when the cuff is in the closed position and the recloseable strap is in the closed position;
wherein the at least one opening on the tongue is present when the dog shoe is configured in a use orientation wherein the top surface of the tongue is releasably attached to the retention element positioned on the front face of the cuff when the cuff is in the closed position and one or more animal toes extend through the at least one opening in the tongue; and
wherein the at least one opening on the tongue is present when the dog shoe is configured in a non-use orientation when the top surface of the tongue is unattached to the retention element on the front face of the cuff and the one or more animal toes do not extend through the at least one opening in the tongue; and
wherein the at least one opening on the tongue restricts lateral movement of the one or more animal toes extended through the at least opening when in the use orientation.

2. The dog shoe of claim 1, wherein the sole is releasably attached to the tongue and rear flap.

3. The dog shoe of claim 1, wherein the rear flap is curved.

4. The dog shoe of claim 1, where the shoe is coated with a durable water repellent material.

5. The dog shoe of claim 1, wherein the sole comprises an interior defined by one or more padded materials.

6. The dog shoe of claim 1, wherein the cuff ends, strap ends, or both are secured around the dog's ankle region using hook and loop closure, snaps, clips, buttons, ties, fasteners, or combinations thereof.

7. The dog shoe of claim 1, wherein the sole comprises a squared heel end, a rounded toe portion, and a widened body portion.

8. The dog shoe of claim 1, wherein the tongue comprises a single opening sized and shaped to accommodate one or more dog toes.

9. A method of protecting a dog's paws from a support surface, the method comprising:
positioning the dog shoe of claim 1 on a first dog paw such that a top surface of the sole contacts a bottom surface of the dog's paw;
applying the cuff to the closed position around an exterior surface of the paw;
positioning one or more dog toes through each tongue opening;
securing the tongue adjacent to the front face of the cuff;
positioning the first and second ends of the strap to the closed position around the exterior of the cuff;
whereby the dog's paw is protected from an external environment.

10. The method of claim 9, wherein the sole is selected based on predetermined use parameters.

11. The method of claim 10, wherein the predetermined use parameters are selected from terrain, temperature, presence of ice or snow, presence of rain, or combinations thereof.

12. The method of claim 9, further comprising repeating the steps for the remaining dog paws.

13. The method of claim 9, wherein the sole is releasably attached to the tongue and rear flap.

14. The method of claim 9, where the bottom face of the sole comprises treads.

15. The method of claim 9, where the shoe is coated with a durable water repellent material.

16. The method of claim 9, wherein the sole comprises an interior defined by one or more padded materials.

17. The method of claim 9, wherein the cuff, straps, or both are secured around the dog's ankle region using a hook and loop closure.

18. A kit comprising:
a plurality of soles, each comprising a top face and an opposed bottom face, a toe end, and an opposed heel end;
one or more rear flaps, each with a first end and a second end, the first end attached to the heel end of the sole and extending in an upward direction;
one or more recloseable cuffs positionable at the second end of the rear flap, each cuff comprising first and second ends, wherein each cuff comprises an open position with the first and second cuff ends opposed from each other and a closed position where the first and second cuff ends of the cuff are attached to form a loop;
one or more tongues configured to be attached to the toe end of a sole and to extend in a forward direction in front of the sole in a first position and to extend upward to contact the cuff in a second position, the tongue comprising a top surface and an opposed bottom surface, each tongue comprising at least one opening that extends through the top and bottom surfaces of the tongue wherein the at least one opening is positioned adjacent to the toe end of the sole in the second position and configured to allow one or more toes of an animal to extend therethrough, wherein the tongue includes an attachment positioned on the top surface of the tongue that releasably attaches to a retention element positioned on a front face of the cuff when the cuff is in the closed position;
one or more recloseable straps positionable at the second end of the rear flap external to the recloseable cuff, the strap comprising first and second ends, wherein the strap comprises an open position with the first and second strap ends opposed from each other and a closed position where the first end second strap ends are attached to form a loop to close around an exterior surface of the cuff when the cuff is in the closed position and when the tongue attachment is positioned on the front face of the cuff, such that the tongue is sandwiched between the front face of the cuff and a rear face of the recloseable strap when the cuff is in the closed position and the recloseable strap is in the closed position;
wherein the at least one opening on each of the one or more tongues is present when the tongue is configured in a use orientation wherein the top surface of each tongue is releasably attached to the retention element positioned on the front face of a corresponding cuff when the cuff is in the closed position and one or more animal toes extend through the at least one opening; and
wherein the at least one opening on each of the one or more tongues is present when the tongue is configured in a non-use orientation when the top surface of the tongue is unattached to the retention element on the front face of the cuff and the one or more animal toes do not extend through the at least one opening; and
wherein the at least one opening on the tongue restricts lateral movement of the one or more animal toes extended through the at least opening when in the use orientation.

19. The kit of claim 18, wherein each sole releasably attaches to a rear flap and tongue using one more or hook and loop closure, snaps, buttons, magnets, zippers, ties, fasteners, or clips.

20. The kit of claim 18, wherein the sole is customized for a dog based on shoe size, ankle size, tread, shoe material, level of padding, or combinations thereof.

* * * * *